United States Patent [19]
Bowers et al.

[11] Patent Number: 5,963,134
[45] Date of Patent: Oct. 5, 1999

[54] INVENTORY SYSTEM USING ARTICLES WITH RFID TAGS

[75] Inventors: John H. Bowers, Clarksburg, N.J.; Thomas J. Clare, Media, Pa.

[73] Assignee: Checkpoint Systems, Inc., Thorofare, N.J.

[21] Appl. No.: 08/899,438

[22] Filed: Jul. 24, 1997

[51] Int. Cl.⁶ ............................................. G08B 13/14
[52] U.S. Cl. ............................. 340/572.1; 340/568.1; 340/568.8; 340/825.3; 340/825.31; 340/825.35; 340/825.54; 235/380; 235/381; 235/383; 235/385
[58] Field of Search ........................... 340/582, 568, 340/825.35, 825.54, 825.31, 825.3, 572.1, 568.1, 568.5, 568.8; 235/380, 381, 385, 383

[56] References Cited

U.S. PATENT DOCUMENTS

| | | | |
|---|---|---|---|
| 3,752,960 | 8/1973 | Walton | 340/825.3 |
| 3,816,708 | 6/1974 | Walton | 340/825.3 |
| 4,141,078 | 2/1979 | Bridges, Jr. et al. | 235/375 |
| 4,223,830 | 9/1980 | Walton | 235/380 |
| 4,580,041 | 4/1986 | Walton | 235/380 |
| 4,583,083 | 4/1986 | Bogasky | 340/572 |
| 4,656,463 | 4/1987 | Anders et al. | 340/572 |
| 4,688,026 | 8/1987 | Scribner et al. | 340/572 |
| 4,746,830 | 5/1988 | Holland | 310/313 D |
| 4,827,395 | 5/1989 | Anders et al. | 364/138 |
| 4,837,568 | 6/1989 | Snaper | 340/825.54 |
| 4,857,893 | 8/1989 | Carroll | 340/572 |
| 4,862,160 | 8/1989 | Ekcian et al. | 340/825.54 |
| 4,881,061 | 11/1989 | Chambers | 340/568 |
| 4,924,210 | 5/1990 | Matsui et al. | 340/572 |
| 4,964,053 | 10/1990 | Humble | 705/416 |
| 5,019,815 | 5/1991 | Lemelson et al. | 340/933 |
| 5,036,308 | 7/1991 | Fockens | 340/572 |
| 5,059,951 | 10/1991 | Kaltner | 340/572 |
| 5,099,226 | 3/1992 | Andrews | 340/572 |
| 5,099,227 | 3/1992 | Geiszler et al. | 340/572 |
| 5,103,222 | 4/1992 | Esch et al. | 340/825.54 |
| 5,119,070 | 6/1992 | Matsumoto et al. | 340/572 |
| 5,151,684 | 9/1992 | Johnsen | |
| 5,153,842 | 10/1992 | Dluos, Sr. et al. | 364/478.15 |
| 5,214,409 | 5/1993 | Beigel | 340/572 |
| 5,214,410 | 5/1993 | Verster | 340/572 |
| 5,218,343 | 6/1993 | Stobbe et al. | 340/572 |
| 5,260,690 | 11/1993 | Mann et al. | 340/572 |
| 5,288,980 | 2/1994 | Patel et al. | 235/381 |

(List continued on next page.)

FOREIGN PATENT DOCUMENTS

| | | |
|---|---|---|
| 0 494 114 | 7/1992 | European Pat. Off. . |
| 0 585 132 | 3/1994 | European Pat. Off. . |
| 0 598 624 | 5/1994 | European Pat. Off. . |
| 0 615 285 | 9/1994 | European Pat. Off. . |

OTHER PUBLICATIONS

Bowers, J. "Road To Intelligent Tagging is Paved with Opportunities," *Automatic I.D. News*, Oct.

*Primary Examiner*—Benjamin C. Lee
*Attorney, Agent, or Firm*—Akin, Gump, Strauss, Hauer & Feld, L.L.P.

[57] ABSTRACT

An article inventory control system for articles, such as books, uses RFID tags attached to each article. Each tag has a unique identification or serial number for identifying the individual article. An inventory database tracks all of the tagged articles and maintains circulation status information for each article. Articles are checked out of the library using a patron self-checkout system. Checked out articles are returned to the library by being deposited into an exterior smart book drop which reads the RFID tag and automatically checks the article back in. Article data from the exterior smart book drop are used to generate reshelving reports for efficiently reshelve the articles. Articles which are used in the library, but not checked out, are returned to interior smart book drops within the library for reshelving. The interior smart book drops capture data regarding in-house use of articles. The data are used to generate historical usage reports. The uncirculated articles are stored on shelves of the library. The shelves are periodically scanned with an RFID scanner for updating inventory status.

22 Claims, 7 Drawing Sheets

U.S. PATENT DOCUMENTS

| | | | |
|---|---|---|---|
| 5,339,074 | 8/1994 | Shindley et al. | 340/825.31 |
| 5,347,263 | 9/1994 | Carroll et al. | 340/572 |
| 5,353,011 | 10/1994 | Wheeler et al. | 340/572 |
| 5,430,441 | 7/1995 | Bickley et al. | 340/825.54 |
| 5,432,864 | 7/1995 | Lu et al. | 382/118 |
| 5,444,223 | 8/1995 | Blama | 235/435 |
| 5,446,447 | 8/1995 | Carney et al. | 340/572 |
| 5,448,110 | 9/1995 | Tuttle et al. | 257/723 |
| 5,450,070 | 9/1995 | Massar et al. | 340/825.35 |
| 5,450,492 | 9/1995 | Hook et al. | 380/28 |
| 5,469,363 | 11/1995 | Saliga | 364/478.13 |
| 5,471,203 | 11/1995 | Sasaki et al. | 340/825.31 |
| 5,490,079 | 2/1996 | Sharpe et al. | 705/418 |
| 5,497,140 | 3/1996 | Tuttle | 342/51 |
| 5,499,017 | 3/1996 | Beigel | 340/572 |
| 5,519,381 | 5/1996 | Marsh et al. | 340/572 |
| 5,539,394 | 7/1996 | Cato et al. | 340/825.54 |
| 5,541,585 | 7/1996 | Duhame et al. | 340/825.69 |
| 5,589,820 | 12/1996 | Robinson et al. | 340/572 |
| 5,602,538 | 2/1997 | Orthmann et al. | 340/825.54 |
| 5,604,486 | 2/1997 | Lauro et al. | 340/572 |
| 5,689,238 | 11/1997 | Cannon, Jr. et al. | 340/568 |
| 5,708,423 | 1/1998 | Ghaffari et al. | 340/825.35 |

DATABASE RECORDS

| TAG IDENTIFICATION INFORMATION | ITEM IDENTIFICATION INFORMATION | LOCATION | CHECKOUT STATUS | PATRON ID |
|---|---|---|---|---|
| S/N 001 | KA-452-1100 1 | MAIN | IN | 000000 |
| S/N 002 | KA-456-1122 1 | MAIN | OUT | 123456 |
| S/N 003 | KA-456-1122 2 | ENGINEERING | OUT | 234567 |
| . . . | | | | |
| S/N 100 | QR-123-340 1 | MAIN | IN | 000001 |

FIG. 4

RESHELVING REPORT ~116

| GO TO LOCATION | RESHELVE ARTICLE | TITLE |
|---|---|---|
| STACK AA-AC | AR-684-Q2 | CAPTAINS OF CONSCIOUSNESS |
| STACK CX-DF | DD-1892-P1 | WHEN BAD THINGS HAPPEN TO... |
| STACK QX-QZ | QY-149-R106 | WHAT COLOR IS YOUR... |
| REFERENCE | RR-505-A4 | TIME MAGAZINE |
| AUDIO-VISUAL | AV-443-U5 | GROVER SINGS THE BLUES |

FIG. 7

HISTORICAL USAGE REPORT — 136

DATES: 1/1/95 - 1/1/96

| CATALOG NUMBER | TITLE | NUMBER OF TIMES PLACED IN INTERIOR BOOK DROP |
|---|---|---|
| RS-149-Q2 | FUNDAMENTALS OF THE INTERNET | 160 |
| BQ-888-R40 | MY BODY, MYSELF | 100 |
| AR-1006-B4 | ENCYCLOPEDIA BRITANNICA | 101 |
| BN-456-Q2 | FAMOUS SHORT PEOPLE | 0 |

FIG. 8

INVENTORY SYSTEM USING ARTICLES WITH RFID TAGS

BACKGROUND OF THE INVENTION

The present invention relates generally to library inventory and circulation control systems, and particularly to such systems which use RFID tags on books and the like.

Libraries face an enormous task of maintaining and controlling large inventories of books, periodicals, audiovisual products, and the like. To facilitate check-in/checkout, inventorying, and theft control of articles in the library collection, most libraries place bar codes and/or sensitizable magnetic strips on the articles. The bar codes allow the articles to be quickly identified using a scanner. The magnetic strip is used in conjunction with a magnetic detection device at the library exit for theft control. The magnetic strip is normally sensitized. When a patron checks out an article, the magnetic strip is desensitized. When the patron returns the article to the library, the magnetic strip is resensitized. The magnetic detection device triggers an alarm if a patron attempts to pass through a controlled exit carrying an article with a sensitized magnetic strip.

Magnetic strip-based systems have numerous disadvantages. Special equipment must be used to desensitize and resensitize the magnetic strips. Typically, library personnel must operate the equipment to ensure that check-in and checkout is performed accurately. An example of such a system is described in U.S. Pat. No. 4,141,078 (Bridges, Jr. et al.). Another library check-in/checkout system which relies upon tagged articles and which is designed to be operated solely by a patron is described in U.S. Pat. No. 5,288,980 (Patel et al.). Yet another general purpose article inventory control system suitable for use in a library is disclosed in U.S. Pat. No. 4,881,061 (Chambers).

Existing library procedures for handling articles are time consuming and lead to many errors. Reshelving articles is a particularly error-prone, time consuming task. Many articles are returned to the wrong location in the library and are subsequently presumed to be lost until discovered during full inventory checks. Furthermore, taking inventory of a library collection is currently such an expensive and time consuming task that most libraries do not conduct a full inventory check as frequently as they should, if at all.

Libraries often review checkout data to determine which articles are of the most interest to their patrons. This information may be used to make decisions about new purchases or to better allocate existing resources. However, libraries fail to capture a large amount of information regarding usage of their collection by patrons who do not check out the articles but who use the articles while in the library. In fact, so-called "internal circulation" makes up ⅔ to ¾ of the total circulation of many libraries. Thus, checkout data fails to accurately measure which articles are of interest to certain patrons.

The largest expense in running a library is personnel costs. Libraries are constantly searching for ways to perform necessary functions with less employees.

Accordingly, there is still a need for systems which allow library employees to further reduce the time and effort spent in article handling, and which provide library managers with better information about how their collection is being used. The present invention fills these needs.

BRIEF SUMMARY OF THE INVENTION

The present invention provides an inventory control system for use in conjunction with articles which are maintained in a storage area. Each of the articles has an RFID tag attached thereto. Each tag includes an antenna for use in detecting the presence of the article by receiving an interrogation signal and returning a response signal. The tag also includes an integrated circuit connected to the antenna for storing article identification information and for outputting the article identification information with the response signal upon interrogation of the tag. The system comprises at least one article return area for receiving articles which were removed from the storage area and which are to be returned to the storage area, the returned article passing through a zone as the article is returned; an interrogator for monitoring the zone for disturbances in the form of a response signal caused by the presence of a tag within the zone, the interrogator outputting an interrogator output signal when a tag is detected in the zone, each interrogator output signal including the identification information stored in the integrated circuit of an interrogated tag; and a database for receiving the interrogator output signals, the database including inventory data for articles monitored by the system including checkout status data, the received interrogator output signals being used to update the checkout status data.

In another embodiment, the present invention comprises an inventory control method for use in conjunction with articles which are maintained in a storage area. Each of the articles has a radio frequency tag attached thereto, with each tag including an antenna for use in detecting the presence of the article by receiving an interrogation signal and returning a response signal. Each tag also has an integrated circuit connected to the antenna for storing article identification information and for outputting the article identification information with the response signal upon interrogation of the tag. The method comprises the steps of:

(a) scanning a portion of the storage area with a mobile interrogator, the mobile interrogator detecting disturbances in the form of response signals caused by the presence of tags within a predefined zone extending from the interrogator and outputting an interrogator output signal when a tag is detected in the zone, each interrogator output signal including the identification information stored in the integrated circuit of an interrogated tag;

(b) repeating step (a) for an adjacent portion of the storage area and for all remaining portions of the storage area; and (c) receiving the interrogator output signals in a database, the database including inventory data for the articles maintained in the storage area, the received interrogator output signals being used to update the inventory data.

The present invention further comprises a library inventory control system for use in conjunction with articles which are maintained in a storage area. Each of the articles has a radio frequency tag attached thereto. Each tag includes an antenna for use in detecting the presence of the article by receiving an interrogation signal and returning a response signal and an integrated circuit connected to the antenna for storing article identification information and for outputting the article identification information with the response signal upon interrogation of the tag. The system comprises an inventory database and a mobile interrogator. The database includes a list of articles in the library and the circulation status of each of the articles. The mobile interrogator scans the storage area in discrete portions, detecting disturbances in the form of a response signal caused by the presence of tags within a predefined zone extending from the interrogator. The interrogator also outputs an interrogator output signal when a tag is detected in the zone. Each interrogator output signal includes the identification information stored in the integrated circuit of an interrogated tag. The inventory database receives the identification information and uses the identification information to update the circulation status of the articles stored therein.

In yet another embodiment, the present invention is a self-service checkout system for a library having articles available for checkout by patrons. Each of the articles has a radio frequency tag attached thereto and each tag includes an antenna for use in detecting the presence of the article by receiving an interrogation signal and returning a response signal and an integrated circuit connected to the antenna for storing article identification information and for outputting the article identification information with the response signal upon interrogation of the tag by an interrogator. The system also has a plurality of patron identification cards, each including a radio frequency tag. The system comprises an interrogator, an inventory database, and a processor. The interrogator is located in a checkout area of the library for interrogating at least one article which the patron wants to borrow and substantially simultaneously interrogating a patron identification (ID) card which identifies a patron to the system. The interrogator receives a response signal containing the stored article identification information for each of the articles to be borrowed and patron identification information from the ID card. The interrogator receives the response signals regardless of the orientation of the articles or patron identification card. The inventory database includes a list of articles in the library and the circulation status of each of the articles. The database receives the patron identification information and the article identification information for each of the articles to be borrowed. The processor is in communication with the database and updates the circulation status of the articles to be borrowed.

In another embodiment, the present invention is a self-service checkout system for a library. The library has articles available for checkout by patrons. Each of the articles has a radio frequency tag attached thereto, and each tag includes an antenna for use in detecting the presence of the article by receiving an interrogation signal and returning a response signal and an integrated circuit connected to the antenna for storing article identification information and for outputting the article identification information with the response signal upon interrogation of the tag by an interrogator. The system comprises a tray for holding a plurality of articles; an interrogator for substantially simultaneously interrogating the plurality of articles placed on the tray which the patron wants to borrow, the interrogator receiving a response signal containing the stored article identification information for each of the plurality of articles to be borrowed, wherein the interrogator receives the response signals regardless of the orientation of the articles; an inventory database including the articles in the library and the circulation status of each of the articles, the database receiving the article identification information for the article to be borrowed; and a processor in communication with the database for updating the circulation status of the articles to be borrowed.

In another embodiment, the present invention is a library inventory control system for use in conjunction with articles which are maintained in a storage area. Each of the articles has a radio frequency tag attached thereto including an antenna for use in detecting the presence of the article by receiving an interrogation signal and returning a response signal and an integrated circuit connected to the antenna for storing article identification information and for outputting the article identification information with the response signal upon interrogation of the tag by an interrogator. The system comprises an inventory database including a list of the articles in the library and the circulation status of each such article; a patron identification device for identifying a patron to the system; an article checkout system located in an article checkout area, the checkout system including a first interrogator for interrogating an article that the patron wants to remove from the storage area, the first interrogator receiving a response signal containing the stored article identification information for the article to be removed; a processor in communication with the first interrogator and the database, the processor receiving the patron identification information and the article identification information for the article to be removed from the first interrogator, and updating the inventory database with the circulation status of the article to be removed; an article check-in system including at least one article return area for receiving articles which were removed from the storage area and which are to be returned to the storage area, each returned article passing through a check-in zone as the article is returned; a second interrogator in communication with the processor, the second interrogator monitoring the check-in zone for disturbances in the form of a response signal caused by the presence of a tag within the zone, and outputting an interrogator output signal when a tag is detected in the zone, each interrogator output signal including the identification information stored in the integrated circuit of an interrogated tag for the article being returned, wherein the inventory database receives the interrogator output signals and updates the checkout status data of the article being returned therewith.

A further embodiment of the present invention is a library inventory control system for use in conjunction with articles which are maintained in the library. Each of the articles has a radio frequency tag attached thereto, each tag including an antenna for use in detecting the presence of the article by receiving an interrogation signal and returning a response signal and an integrated circuit connected to the antenna for storing article identification information and for outputting the article identification information with the response signal upon interrogation of the tag by an interrogator. The system comprises:

- an inventory database including a list of the articles in the library and the circulation status of each such article;
- a patron identification device for identifying a patron to the system;
- an article checkout system located in an article checkout area of the library, the checkout system including a first interrogator for interrogating an article that the patron wants to remove from the library, the first interrogator receiving a response signal containing the stored article identification information for the article to be removed;
- a processor in communication with the first interrogator and the database, the processor receiving the patron identification information and the article identification information for the article to be removed from the first interrogator, and updating the inventory database with the circulation status of the article to be removed;
- a video camera for capturing images of the checkout area and outputting video signals of the captured images;
- a video recorder for storing the video signals on a video storage medium;
- an article check-in system including at least one article return area for receiving articles which were removed from the library, each returned article passing through a check-in zone as the article is returned;
- a second interrogator in communication with the inventory database, the second interrogator monitoring the check-in zone for disturbances in the form of a response signal caused by the presence of a tag within the zone, and outputting an interrogator output signal when a tag is detected in the zone, each interrogator output signal including the identification information stored in the integrated circuit of an interrogated tag for the article being returned, wherein the inventory database receives the interrogator output signals and updates the checkout status of the article being returned using the interrogator output signals;

a mobile interrogator for scanning discrete portions of the library and detecting disturbances in the form of response signals caused by the presence of tags within a predefined zone extending from the mobile interrogator, and for outputting an interrogator output signal when a tag is detected in the zone, each interrogator output signal including the identification information stored in the integrated circuit of an interrogated tag, wherein the database receives the identification information and updates the circulation status of the articles stored therein with the information;

an exit interrogator for monitoring an exit from the library, the exit interrogator for interrogating an article passing through the exit and thereby being removed from the library, the exit interrogator receiving a response signal from the tag associated with the article, the response signal containing the stored article identification information for the article passing through the exit;

an exit processor coupled to the exit interrogator, the exit processor receiving an output signal from the exit interrogator including the identification information of the response signal, wherein the exit processor compares the received identification information with the information stored in the database to determine whether the article is recorded therein as checked out, wherein the exit interrogator activates an alarm if the article passing through the exit is not recorded in the database as checked out; and a zone interrogator located at an exit of a predefined area of the library, the zone interrogator for detecting the removal of tagged articles from the predefined area, wherein the zone interrogator activates an alarm in response to the detection of the removal of an article from the predefined area.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 4 is a sample of database records for tagged articles used by the library of FIG. 1;

FIG. 7 is a sample of a reshelving report generated from data collected by the smart book drop of FIG. 6;

FIG. 8 is a sample of a historical usage report generated from data collected by internal smart book drops of FIG. 7;

DETAILED DESCRIPTION OF THE INVENTION

Figure 1:
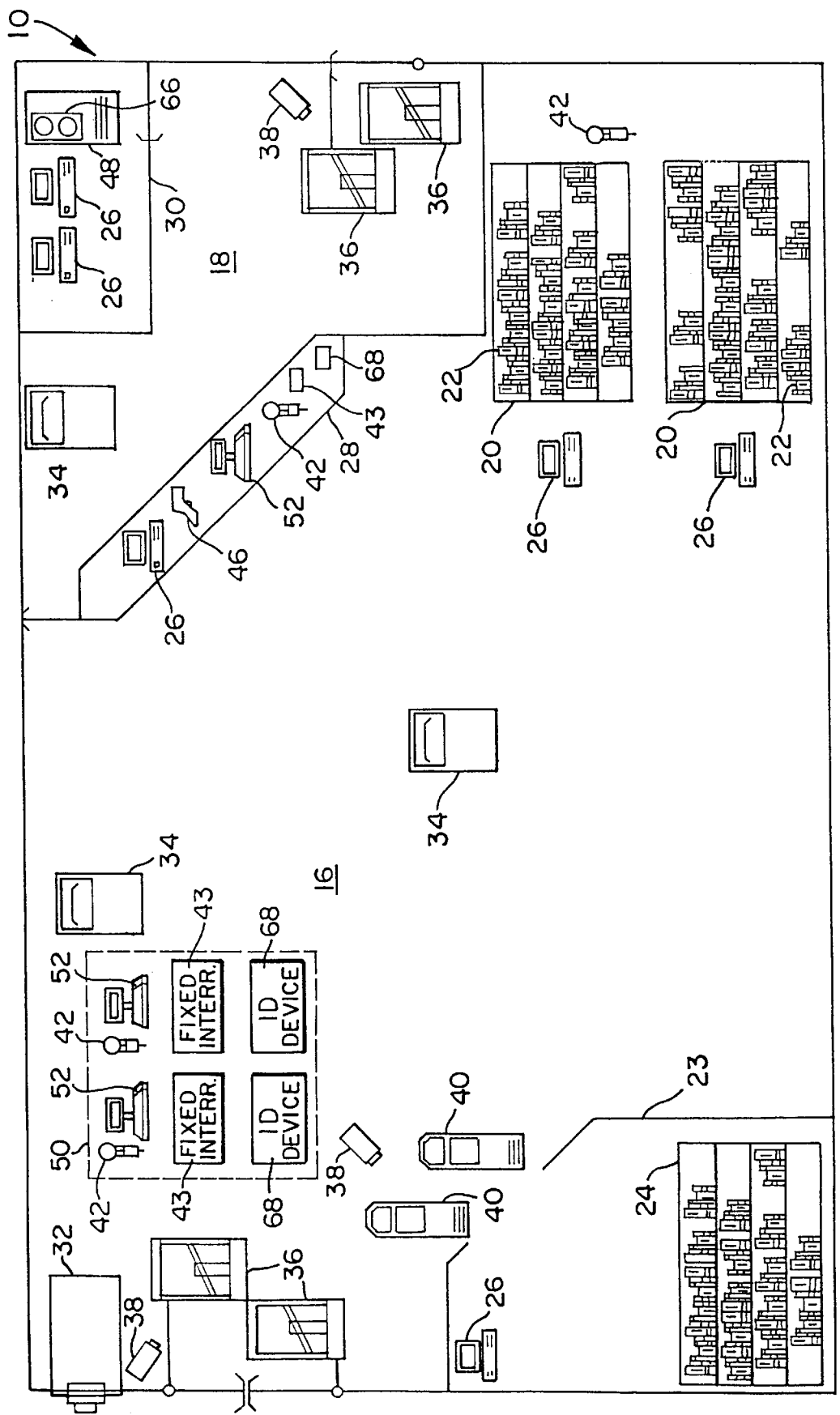
FIG. 1 is a schematic layout diagram of a library for illustrating general features of the present invention.

Certain terminology is used herein for convenience only and is not be taken as a limitation on the present invention. In the drawings, the same reference numerals are employed for designating the same elements throughout the several figures.

FIG. 1 is a schematic diagram of a storage area in the form of a library 10 for use in explaining the novel features of the present invention. While the present invention is explained in the environment of a library, the scope of the invention includes other environments in which articles are maintained in a storage area and are periodically removed (permanently) or are borrowed for limited periods of time by patrons, such as video stores, rental stores, or the like. The storage area may also be associated with a commercial/industrial environment, and may, for example, be a tool crib, maintenance depot, or the like.

An interrogator, as defined herein, is a device which is used to couple energy to an RFID tag to power the tag and to receive data from the tag. The present invention uses different forms of interrogators, including scanners, "smart" and "dumb" pedestals, and the like.

Referring to FIG. 1, the library 10 is divided into a public space area 16 for use by library patrons, and an employee space area 18. The public space area 16 includes a storage area in the form of a plurality of shelves or stacks 20 for holding articles such as books, periodicals, audio tapes, CD's, video tapes, wall art, sheet music and the like 22, a periodical room 23 having additional shelves or stacks 24, and a plurality of on-line computerized catalogs 26 of library holdings. A circulation desk 28 separates a portion of the public space area 16 from a portion of the employee space area 18. The employee space area 18 includes a back office operations area 30. Additional on-line computerized catalogs 26 are located at the circulation desk 28 and in the back office operations area 30. Other miscellaneous computer equipment may be placed in these locations, such as a bar code reader 46, or a computer 48. A database associated with the computer 48 stores inventory data on all of the articles 22 in the library collection, as well as data regarding articles 22 checked out by patrons. The on-line catalogs 26 are connected to the computer 48 and its database. All of the features and elements described above are conventional. Libraries also typically include areas devoted to other resource information, such as videos, CD-ROMs, cassettes or the like. For brevity, these alternative resources are not shown in FIG. 1. Throughout the specification, the word articles and books are used interchangeably. However, it should be understood that the scope of the word "article" includes other types of items which are typically found in a library, such as videos, CD-ROMS, cassettes, newspapers or the like.

The library 10 further includes elements which are associated with novel methods and systems for inventory control and article usage tracking.

First, the library includes a plurality of "smart" article return areas or book drops. Prior art book drops merely functioned to provide a temporary storage location for books which were being returned by patrons for check-in and reshelving. The "smart" book drops of the present invention interrogate the articles 22 as they pass into the book drop and read, record and process information about their identity. FIG. 1 shows one smart exterior article return area or book drop 32 and three smart interior article return areas or book drops 34. The exterior book drop 32 allows patrons to return articles when the library 10 is closed or when the patron does not wish to physically enter the library 10. The library policy might also require all checked out articles 22 to be returned to the exterior book drop 32. The book drops 32 or 34 may thus function as a check-in terminal for articles 22 being returned. The interior book drops 34 may be placed in the public area 16 and/or in the employee space area 18. When patrons return articles 22 to the circulation desk 28, an employee places the article 22 in the interior book drop 34 located in the employee space area 18. Patrons may also place borrowed articles 22 in either of the publicly located interior book drops 34. In both instances, the borrowed articles may be articles being returned after being checked out or articles which were used by the patron while in the library but which were not checked out. Each of the articles 22 have a radio frequency identification (RFID) tag, sometimes referred to as an "intelligent tag" attached thereto. The RFID tag thus becomes an intelligent security tag in the disclosed embodiment of the invention. The RFID tags are described below with respect to FIG. 2. When the RFID tags are properly interrogated, they return unique information which can be used to determine the identity of the article 22 and its proper location in the library.

Second, the library 10 includes one or more pairs of "smart" pedestals 36. A pair of "smart pedestals" as described, are pedestal-configured devices which contain interrogators capable of communicating with RFID tags. A pair of smart pedestals 36 reads RFID tags when tagged articles 22 are within a predesignated zone between the pedestals 36. In FIG. 1, one pair of smart pedestals 36 monitors a zone in which a patron must pass through to enter or exit the library 10. Another pair of smart pedestals 36 monitors a zone in which employees enter and exit the library 10. Each of the zones are optionally monitored by a surveillance camera 38 or a biometric measurement device. The output of each pair of smart pedestals 36 is connected to the database of the computer 48 for verifying whether detected articles 22 within the zone between the pedestals 36 have been properly checked out. The library 10 may also include a pair of sensors, referred to herein as "dumb pedestals 40", for detecting the presence of articles carrying prior art security tags, such as magnetic security tags or non-intelligent resonant security tags. The dumb pedestals 40 may be used to ensure that periodicals remain within a designated portion of the library 10 (e.g., periodical room 23). Alternatively, the dumb pedestals 40 may be similar to the smart pedestals 36 but are not connected to the database of the computer 48. Since no articles 24 are permitted to be removed from the periodical room 23, the detection of any article 24 between the dumb pedestals 40 triggers an alarm.

Third, the library 10 includes portable radio frequency (RFID) tag scanners or so-called "RFID scanners". These scanners can read identification information associated with an RFID tag, as described more fully below. One RFID scanner 42 is shown at the circulation desk 28, and a portable scanner 42 is shown adjacent to a set of book shelves 20. Two additional scanners 42 are associated with a novel checkout station, described next. When portability is not required, a fixed interrogator 43 may be used at the circulation desk 28 and novel checkout station in place of, or in conjunction with, the portable scanner 42.

Fourth, the library includes a patron self-checkout station 50 for allowing library patrons to check out articles 22 for removal from the premises. The checkout station 50 includes a fixed interrogator 43, and optionally, one or more optional portable RFID scanners 42, both of which are used for identifying articles 22 presented at the checkout station 50. The checkout station 50 also includes at least one computer terminal 52 for receiving data from the fixed interrogator 43 and scanner 42. The computer terminal 52 is also connected to a patron identification device 68. The circulation desk 28 also includes a fixed interrogator 43, an optional scanner 42, computer terminal 52 and patron identification device 68 which may be used by either patrons or employees for article checkout. The patron self-checkout station 50 is described in more detail below with respect to FIG. 5.

The novel systems of the present invention all use an RFID tag which is attached to each article 22. While such tags are well-known in the prior art, one particular type of RFID tag which is particularly suitable for use with the present invention is a passive radio frequency tag having an antenna, and in the preferred embodiment, an RFID tag comprising an antenna or inductor coil connected to an integrated circuit.

Figure 2:
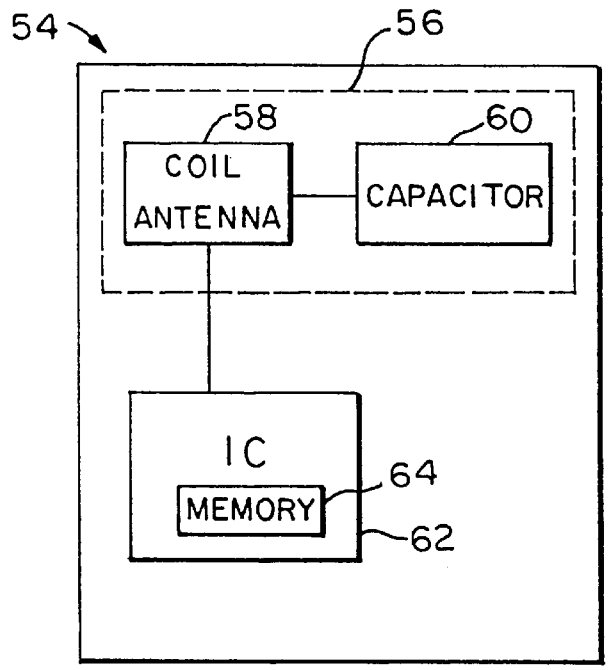
FIG. 2 is a block diagram schematic of an RFID tag suitable for use on articles circulated by the library of FIG. 1.

FIG. 2 shows general details of a sample RFID tag 54, suitable for use with the present invention. The tag 54 includes a passive resonant radio frequency (RF) circuit 56 for use in detecting when the tag 54 is within a zone monitored by a reader or interrogator, as is well-known in the art. One well-known type of circuit 56 has a coil antenna 58 and a capacitor 60 which together form a resonant circuit with a predetermined resonant frequency i.e., the selected radio frequency. Power for the tag 54 is derived from the antenna 58 in a conventional manner. Furthermore, the tag 54 includes an integrated circuit (IC) 62 for providing "intelligence" to the tag 54. The IC 62 is connected to the circuit 56. The IC 62 includes a programmable memory 64, such as a 64 bit memory, for storing bits of identification data. Of course, other tag designs could also be used with the present invention, and the invention is not limited to the particular tag 54 shown. For instance, the capacitor 60 could be located on the IC 62, with only an inductor coil being outside the IC 62.

The IC 62 outputs a data stream comprised of the 64 bits of stored data when sufficient power is applied thereto. In one embodiment of the invention, the data stream creates a series of data pulses by switching an extra capacitor (not shown) across the coil antenna 58 for the duration of the data pulses. This changes the resonant frequency of the RF circuit 56, detuning it from the operational frequency. Thus, instead of the RF circuit 56 returning a simple response signal, it returns a signal containing a packet of preprogrammed information. The packet of information (data pulses) is received and processed by interrogator receiving circuitry and is decoded (if necessary) to provide identification information about the article 22. Other methods of using the data in the IC memory 64 to output identification data from the tag 54 are within the scope of the invention. The IC 62 is preferably also a passive device and is powered in the same manner as the RF circuit 56 (i.e., by using energy received at the antenna 58 from the interrogator transmitter signal). The tag 54 is thus a so-called "radio frequency identification (RFID) tag". Other types of RFID tags may be used with the present invention. Examples of other RFID tags which are suitable for use as the tag 54 are shown in U.S. Pat. No. 5,446,447 (Carney et al.), U.S. Pat. No. 5,430,441 (Bickley et al.), and U.S. Pat. No. 5,347,263 (Carroll et al.). Typically, RFID tags are not physically deactivated. That is, they are not permanently shorted out in a manner which prevents reuse, and they are not rendered inactive by magnetizing or demagnetizing a magnet therein.

Figure 3:
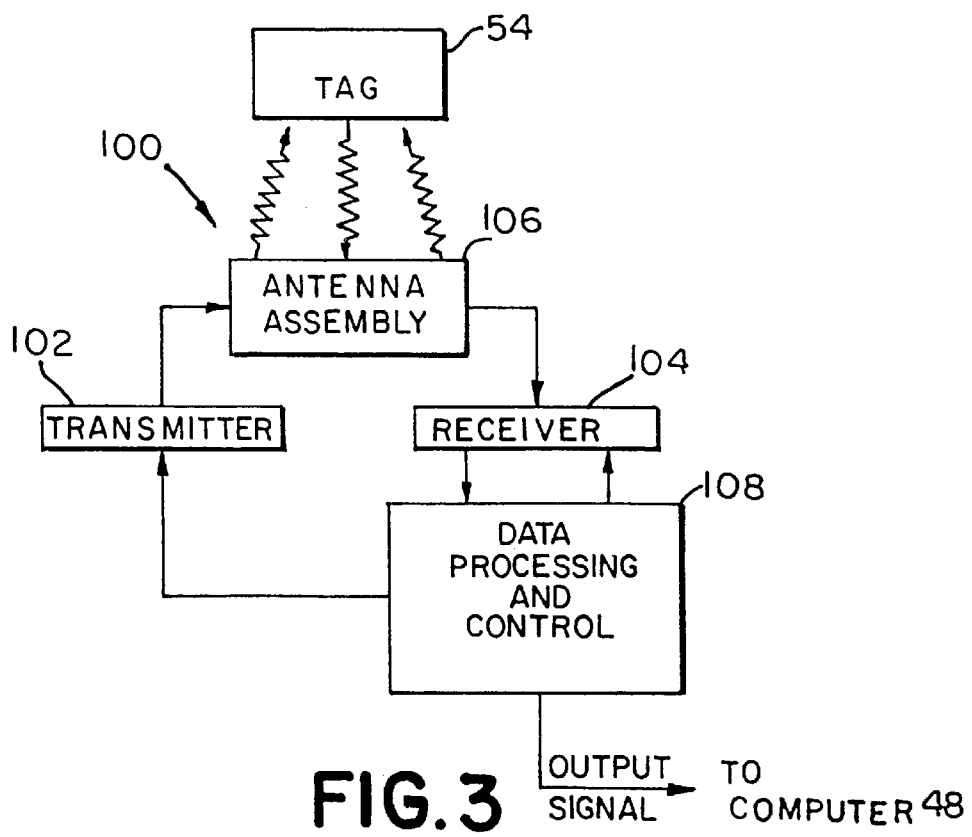
FIG. 3 is a detailed functional block diagram schematic of an interrogator for use in reading the tag of FIG. 2.

FIG. 3 is a block diagram schematic of a reader or interrogator 100 suitable for use with the tag 54 described in FIG. 2. The interrogator 100 and the tag 54 communicate by inductive coupling, as is well-known in the art. The interrogator 100 includes a transmitter 102, receiver 104, antenna assembly 106, and data processing and control circuitry 108, each having inputs and outputs. The output of the transmitter 102 is connected to a first input of the receiver 104, and to the input of the antenna assembly 106. The output of the antenna assembly 106 is connected to a second input of the receiver 104. A first and a second output of the data processing and control circuitry 108 are connected to the input of the transmitter 102 and to a third input of the receiver 104, respectively. Furthermore, the output of the receiver 104 is connected to the input of the data processing and control circuitry 108. Interrogators having this general configuration may be built using circuitry described in U.S. Pat. Nos. 3,752,960, 3,816,708, 4,223,830 and 4,580,041, all issued to Walton, all of which are incorporated by reference in their entirety herein. The interrogator 100 is physically implemented as a pair of smart pedestals 36, or as a portable RFID scanner 42, as illustrated in FIG. 1.

One preferred embodiment of a portable scanner 42 has a plate or disc-like resonant circuit antenna about six inches to about eight inches in diameter, and is mounted on an arm extension to reach top and bottom shelves of book stacks.

Before any of the novel systems of the present invention are implemented, the library 10 tags the articles 22 and sets up a database within the computer 48 of all tagged articles 22. Ideally, all of the articles 22 in the library are tagged. However, the systems can function, although less efficiently, even if not every article is tagged. In one embodiment of the invention, the library 10 receives blank (unprogrammed) tags 54, assigns unique serial numbers to each of the tags 54 by suitable programming (if they are not already preassigned), physically attaches the tags 54 to each of the articles 22, and creates a database which correlates each tag 54, specifically the unique serial number thereof, to the respective article 22. The programming step is eliminated if the articles 22 arrive pretagged at the library 10.

In the example illustrated herein, the library 10 applies tags 54 to 100 articles. Next, an inventory database is created in the following manner:

1. An article 22 is read by a fixed interrogator 43 or by a portable RFID scanner 42 which extracts the unique programmed serial number from the tag 54.
2. A database record is added for the serial number.
3. Next, item identification information is obtained for the article 22, by any means, such as by reading existing bar codes or labels on the article 22 or by manually entering identifying information or reading such information from another database or storage device. The item identification information is then added to the database record for the respective tag serial number. Most large libraries already have an automated on-line catalog which is generated from an existing database of their collection (i.e., articles 22). Thus, the library 10 need only add information to an existing data field to identify the serial number of the specific tag 54 which is attached to the article 22, rather than create an entirely new database of information for tagged articles 22. Alternatively, the library 10 could maintain its existing on-line catalog and create a new database for tracking the status of the tagged articles 22. The discussion below presumes that the library 10 sets up either a fully integrated database or that the on-line catalog information is linked with the tagged article database so that all available information about an article 22 is easily retrievable. The database of articles 22 in the library collection also includes circulation status information (not shown), such as whether an article 22 is checked out, who has checked it out, and when it is due back (i.e., article due data).

FIG. 4 is a sample of a sequence of database records created by the process described above. Each record includes a field for tag identification information (e.g., the serial number of the tag 22) and a field for item identification information. Tag identification information correlates with "article identification information" and so is also referred to as "article identification information." That is, because the tag serial number is unique, it may be used to identify the article. The item identification information may be a Dewey Decimal System call number, a Library of Congress call number, ISBN number, or an arbitrarily assigned number. The last digit of item identification information may be used to identify the copy number of the item in the library's inventory. Item identification information may also include any part of the bibliographic data, such as title, author, publisher and the like. optionally, the database record may include additional information, such as a predetermined location of a large library system where the article 22 is stored. Universities typically have individual department libraries, in addition to a main library. Large governmental library systems have plural branches. The additional location information may be used to properly identify the articles 22 with such respective locations. The database of tagged articles 22 (whether constructed as a separate database or whether appended to the existing on-line catalog 26) is stored in the computer 48 as database 66, but may also be stored in a remote computer (not shown).

The database 66 may also optionally include a field for maintaining the checkout status of each article 22 and a field for maintaining the present location of the article 22. For instance, a checked out article is flagged as checked out in the checkout status field and the patron identification number of the patron who checked out the article is stored in the patron ID field. The patron ID field may also signify that the article is presently on the library shelf (for instance, with a zero (000000) stored in the Patron ID field) and indicate that the article has been returned and not yet reshelved (for instance, with a 000001 stored in the Patron ID field). It will be understood that the checkout status and the patron ID field, as well as other fields, may be stored in a separate database, or stored as a linked list, and that other information may also be stored in the database 66 or linked to the database 66.

Figure 5:
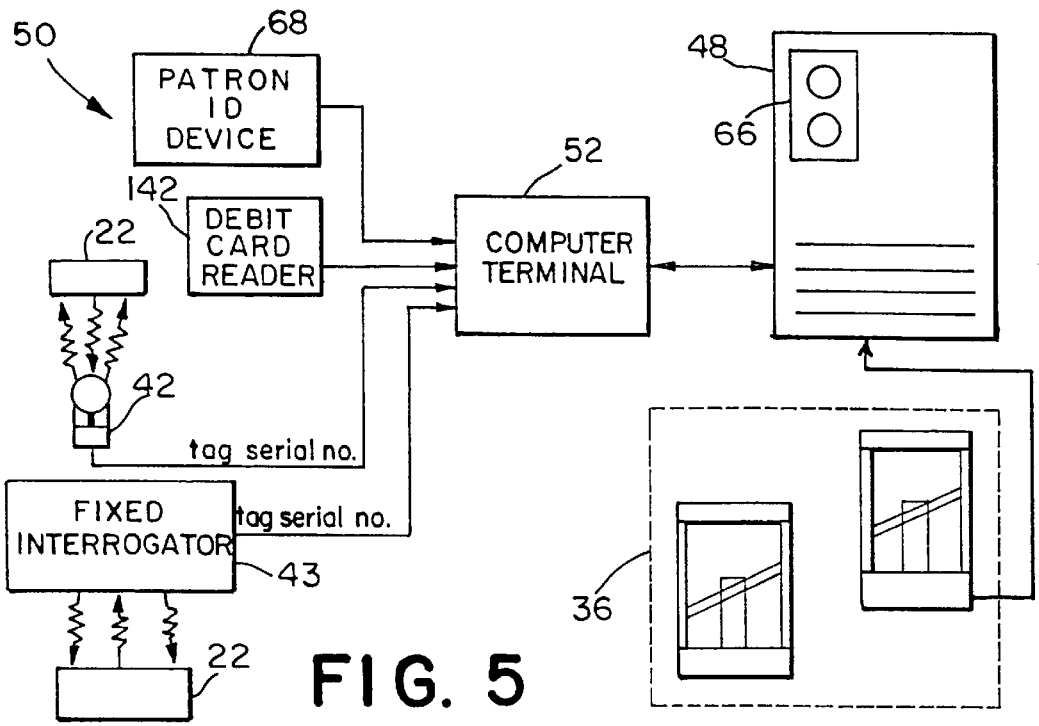
FIG. 5 is a block diagram schematic of a patron self-checkout system for use in the library of FIG. 1.
Figure 6:
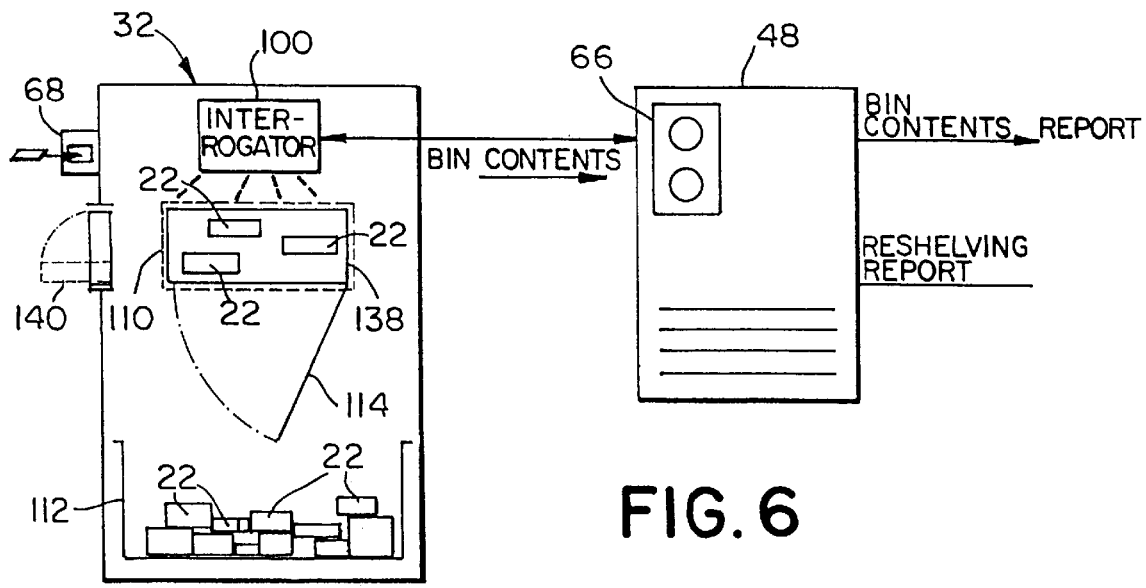
FIG. 6 is a block diagram schematic of a smart book drop for use in the library of FIG. 1.
Figure 9:
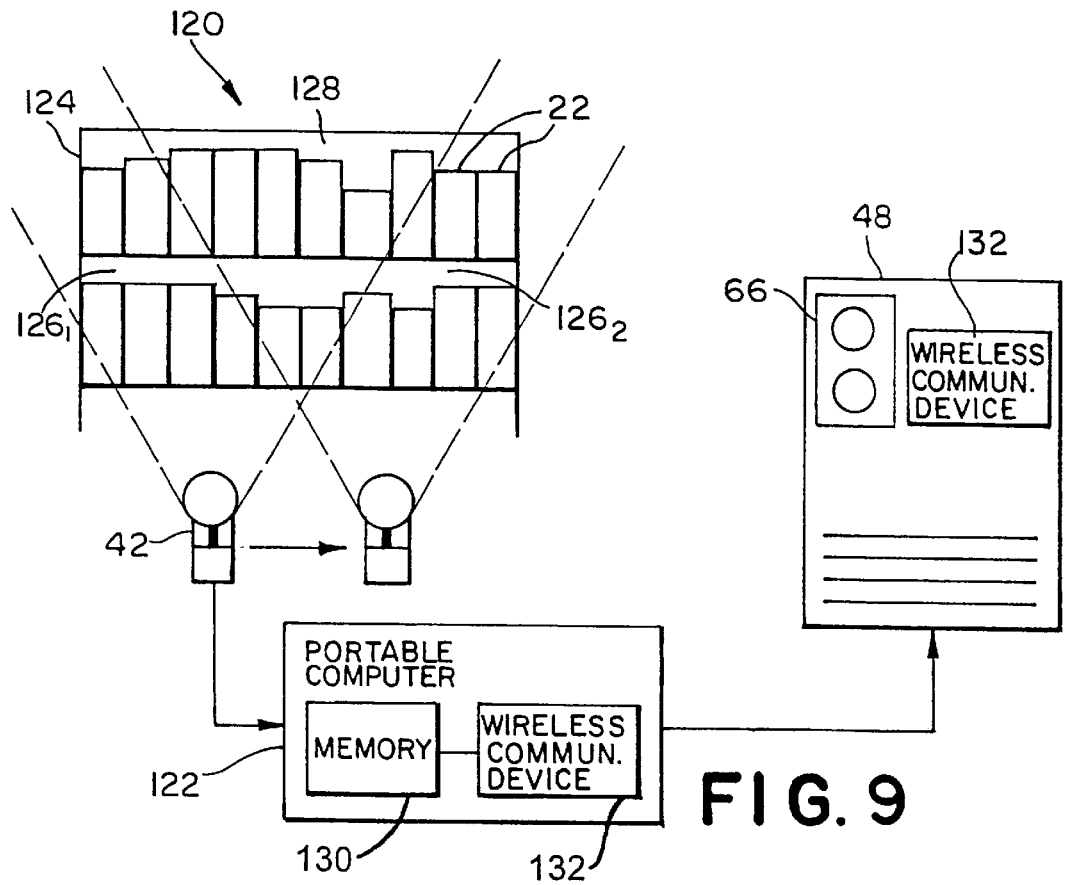
FIG. 9 is a block diagram schematic of a shelf scanning inventory system.

FIGS. 5, 6 and 9 show systems in accordance with the present invention which can be implemented after the articles 22 are tagged and the database 66 is established.

More particularly, FIG. 5 shows a patron self-checkout system, FIG. 6 shows a smart book drop, and FIG. 9 shows a shelf scanning inventory system. For clarity, these figures are described together with FIG. 1.

Referring to FIG. 5, there is shown a schematic block diagram of the patron self-checkout system 50 in FIG. 1. When a patron wishes to check out an article 22 from the library collection, the patron identifies himself or herself to the system through a patron identification (ID) device 68. The patron ID device 68 may be a card reader, such as a bar code reader or magnetic stripe reader for reading data from a patron's library card. The patron ID device 68 may also be the same fixed interrogator 43 or RFID scanner 42 used for interrogating articles 22. Alternatively, the patron ID device 68 may be a biometric (physiological) reading device, such as a fingerprint or iris scanner. In another alternative embodiment of the invention, the patron may directly identify himself or herself to the system 50 by entering an ID and/or password into the computer terminal 52. The patron ID data is received by the computer terminal 52 which communicates with a database of patrons stored in the computer 48 to verify that the patron is authorized to check out articles 22. If the patron is not in the patron database or if the patron is delinquent, the checkout procedure may be either terminated or the computer terminal may enter a patron registration routine. After the patron is identified and determined to be an authorized user, the checkout process may begin by performing the following steps. The patron manipulates either the article 22 to be checked out and/or the fixed interrogator 43 or scanner 42 so as to interrogate the tag 54 associated with the article 22 and read the data returned by the tag 54. Since the article 22 is preferably tagged with the RFID tag 54, the article 22 need only be placed in proximity to the interrogator 43 or scanner 42. The data output from the interrogator 43 or scanner 42 includes the serial number of the tag 54. The tag serial number is sent directly, or through the computer terminal 52, to the computer 48 which locates the appropriate record for the article 22 in its database 66. If an article 22 is properly checked into the library 10, a patron may check it out. The database 66 is then updated to show that the article 22 has been checked out to the patron currently using the station 50. These checkout steps are repeated for each article 22 that the patron wishes to check out.

Figure 12:
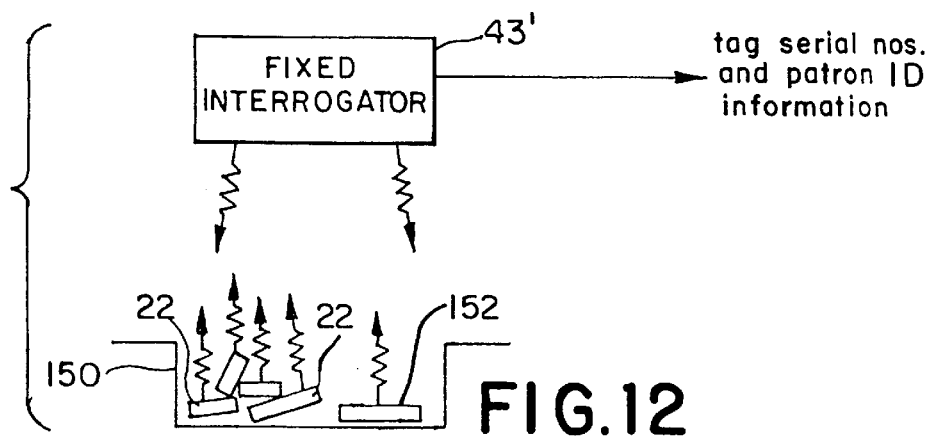
FIG. 12 shows an alternative inputting process for the patron self-checkout system in FIG. 5.

FIG. 12 shows an alternative inputting process for the patron self-checkout system 50 in FIGS. 1 and 5. All of the articles 22 which the patron wishes to check out may be placed on a tray 150 or in a predefined interrogation zone, such as a housing, in the proximity of the fixed interrogator 43' which simultaneously interrogates all of the articles 22. RFID interrogators do not require a line of sight, and thus may simultaneously interrogate multiple tags which are placed in a defined region regardless of their orientation in the region. The interrogator 43' may also be designed to read both a patron ID card 152 (which may also include a tag 54), as well as the tags 54 attached to the articles 22. Thus, the patron ID device 68 of FIG. 5 may be incorporated into the interrogator 43' of FIG. 12. To check out, the patron merely places the ID card 152 and the articles 22 in a defined region, and initiates a checkout process. The data output from the interrogator 43' is communicated to the database 48 either directly or via the computer terminal 52 (FIG. 5).

The computer terminal 52 may be used to prompt the patron through the checkout steps and to return information regarding the steps, such as messages verifying the result of each article interrogation. The computer terminal 52 may also inform a patron of the due date for the article 22 and may optionally include a printer for generating a record of the checkout transaction and due date for the patron.

To ensure that only articles 22 which were properly checked out are removed from the library 10, the pair of smart pedestals 36 (which incorporates the elements of the interrogator 100 of FIG. 3 therein) interrogates the articles 22 as they pass through a zone in which a patron or employee must pass through to exit the library 10. The status of each interrogated article 22 is checked in the database 66. If an article 22 is not properly checked out, a visible and/or audio alarm is triggered to alert the patron and library employees to the problem. Alternatively, the alarm may cause a gate (not shown) to lock, thereby preventing the patron or employee from exiting the library 10. Alternatively, the information about the non-checked out article is recorded in a database and no alarm is activated. As noted above, the exit zones are optionally monitored by a surveillance camera 38 or biometric measurement device which is activated by the alarm signal to record an image or biometric data of the patron or employee passing through the zone. The image would be useful if the patron or employee disregards the alarm and exits the library 10 with the unchecked out article(s) 22.

In an optional configuration, check out occurs automatically as the patron exits the library. In this embodiment, the interrogator associated with the smart pedestals 36 can read both the patron ID card (which is also includes an RFID tag) as well as the tags 54 attached to the articles 22. As the patron walks past the smart pedestals 36, the articles 22 are automatically checked out. Alternatively, the patron may be required to insert an identification card into a card reader which unlocks an exit door or passage barrier. Smart pedestals 36 are placed at the exit door or passage barrier. As the patron passes through the exit door or passage barrier, the interrogator associated with the smart pedestals 36 checks out the articles 22.

These optional configurations are particularly suitable for unattended libraries, typically found in private, corporate or university settings.

If the tag of the article 22 has write or rewrite capabilities, one or more bits of tag memory may be used to indicate the "checked out" status of the article 22. During checkout, the appropriate changes are made to the one or more bits. In this case, if the interrogator associated with the smart pedestals 36 detects that the article has been properly checked out, it is not necessary to search the database 66 to determine the status of the article 22, and the patron passes through the zone without sounding any alarms or causing any article database searching to occur.

Referring to FIG. 6, there is shown a schematic block diagram of an exterior smart book drop 32 in FIG. 1. When a patron wishes to return an article 22 to the library 10, the patron merely deposits the article 22 into the smart book drop 32. The exterior smart book drop 32 includes a tray, a panel, a compartment, or the like (labeled as 138), for initially supporting the articles 22 placed in the book drop 32. The exterior boundary of the tray 138 is coincident with an interrogation zone 110 defined by dashed lines in FIG. 6. The book drop 32 also includes a collection bin 112 for receiving and holding articles 22 accepted by the book drop 32.

In operation, once a patron gains access to the tray 138 and places articles 22 thereon, an interrogator 100 reads the tags 54 of the articles 22 and compares the received serial numbers of the read articles 22 with the serial numbers in its database 66. If the articles 22 belong to the library 10, the book drop 32 allows the articles 22 to pass into the collection bin 112 (such as by releasing a gate 114) and signals to the database 66 in the computer 48 that the articles 22 were returned. Otherwise, a display panel or like (not shown) informs the patron that the articles 22 do not belong to the library 10 and should be removed from the tray 138. If the articles do not have tags 54, and the library 10 has tagged its entire collection, the library 10 also informs the patron that the articles do not belong to the library 10 and should be removed from the tray 138. If the articles do not have tags 54, and the library 10 has not tagged its entire collection, the library 10 may wish to accept the articles even though they might not belong to the library collection. Any articles which do not belong to the library 10 are processed by the library employees after the collection bin 112 is emptied.

In alternative embodiments of the book drop 32, there is no tray 138. Instead, the articles 22 are merely dropped into the book drop 32 through a slot and fall directly into the collection bin 112. The articles 22 are read by the interrogator 100 as they fall into the collection bin 112, or all at once before the bin 112 is emptied. If the articles 22 are interrogated all at once, it is only necessary that the range of the interrogator 100 be sufficient to reach all areas of the bin 112.

One problem with exterior book drops is that vandals sometimes try to damage articles previously inserted into the book drop or try to damage to the book drop itself. For example, a vandal might pour liquids or messy food items into the book drop. In the worst case, a vandal might pour flammable liquids or burning objects into the book drop to try to start a fire therein. To minimize access to internal parts of the exterior smart book drop 32 by vandals, the book drop 32 may include a patron ID device 68 similar to that described in FIG. 5, and an access door 140 for gaining access to the tray 138. The access door 140 opens only if the patron is an authorized user.

The book drop 32 may also have means to detect a jam caused by a stuck article 22, and means to report the jam to the computer 48. A jam can be presumed if the interrogator 100 repeatedly detects the same serial number in the interrogation zone 110 over an extended period of time.

At periodic intervals, the library employees empty the collection bin 112 and reshelve the articles 22. To ensure that all articles are properly checked back in, the library employees may wish to interrogate the collection bin 112 before the articles 22 are reshelved. Optionally, a check-in reader may be positioned adjacent to the book drop or book return processing work space wherein the employee may cause articles 22 to be interrogated as part of the sorting and handling process. A terminal associated with the check-in interrogator can provide instructions to the employee about special handling requirements and the like.

The data generated by the exterior book drop 32 are used by the database 66 to create a bin contents report and a reshelving report. The bin contents report may be used to quickly determine if a particular article of interest is in the collection bin 112 without having to physically sort through the bin 112. The bin contents report may also highlight articles 22 which are normally kept on reserve or which were requested by another patron. The bin contents report also provides general data about the articles 22 in the collection bin 112. One type of bin contents report is a reshelving report which may be used for article reshelving. Libraries devote an enormous amount of labor resources to reshelve articles (e.g., books, periodicals and the like) in their collection. Typically, all of the articles 22 are brought to a central location, sorted by location (e.g., floor, stack or shelf, row), placed on different carts and delivered to their respective shelving locations. The reshelving report can be used to dramatically reduce the time and effort spent to reshelve articles 22.

FIG. 7 is a sample of a reshelving report 116 generated by five articles 22 in a collection bin 112. The report 116 provides a listing of articles 22 ordered according to shelf location. The shelf location may be the row of shelves which contains the respective article, or any other designating information to assist the employee in returning the articles 22, such as floor/shelf location.

Providing such a sorted shelving report 116 can aid the reshelving process. For instance, in one method of reshelving using the report 116, an employee merely moves the collection bin 112 to the first location listed on the reshelving report 116, locates in the collection bin 112 the first article 22 on the report 116, and places it on the shelf. This process may then be repeated for each article 22 on the reshelving report 116. If the collection bin 112 is not movable, the articles 22 may need only be transferred to a movable cart and the process above performed by moving the movable cart from location to location. The reshelving report 116 is preferably ordered to take advantage of a preprogrammed shortest path route through the library. Generating a shortest path route from predesignated locations is well-known in the prior art.

Referring again to FIG. 1, the library 10 includes one or more interior smart book drops 34 in the public area 16 and/or the employee space area 18. The interior book drops 34 are similar to the exterior book drop 32, except that most of the articles 22 placed in the interior book drops 34 are articles 22 that the library patrons use while in the library, but which are not checked out. Thus, it is not necessary to update the status of the returned articles 22 to indicate that they are checked back in. However, the database 66 in the computer 48 should be checked and updated, if necessary, because some of the articles 22 placed in the interior book drops 34 may be previously checked out articles 22 which are being returned by patrons.

A bin contents report is also generated from the interior book drops 34. (The report does not include previously checked out articles 22 which are being returned by patrons, since this information is tracked elsewhere). Bin contents reports are accumulated over a period of time and used to generate a historical usage report of articles 22 which are used by patrons within the library 10, but which are not checked out. This information is extremely valuable because it allows the library 10 to capture internal usage data about articles 22 in its collection. Libraries constantly evaluate usage patterns of articles in its collection to determine trends in patron interest to decide what types of new articles 22 to purchase, when to remove articles 22 from the library floor, how floor space should be most effectively used, and to assist in other management tasks. Currently, libraries rely on checkout data, observations by librarians, and comments and requests by patrons to evaluate these issues. However, checkout data does not capture all of the patron activity associated with a library. Patrons typically do not check out every article 22 of interest to them. A large percentage of articles 22 are reference items which cannot be checked out. Some patrons may be embarrassed to check out certain articles and read them only at the library. Some articles 22 do not need to be checked out because the patron can quickly obtain the information of interest from the article 22 while in the library. Observations by librarians and comments and requests by patrons may not accurately capture the interests of certain patrons. The historical usage reports generated from interior book drop data allow the library to better capture patron trends and interests.

FIG. 8 is a sample historical usage report 136. Of course, the data may be presented and sorted by any appropriate field. Likewise, the historical usage report 136 for the interior book drops 34 may be merged with a historical usage report (not shown) for checked out articles 22 to obtain a more accurate picture of articles 22 of interest to all patrons.

To most efficiently reshelve articles 22, all of the articles placed in the interior and exterior book drops 34 and 32 may be periodically brought to a single movable cart, and reshelving reports from the interior and exterior book drops 34 and 32 may be merged into a single reshelving report for the single cart.

Information derived from the contents of the book drops 32 and 34 may also be used to help locate a particularly "hot" article 22 which another patron has requested. Library staff presently spend a disproportionate amount of time circulating relatively few hot articles 22. By knowing exactly which book drop 32, 34 contains the hot article 22, the time and effort spent recirculating the hot articles 22 is reduced.

FIG. 9 shows a shelf scanning inventory system 120 for the library 10 in FIG. 1. The system 120 is used to perform inventory and to verify that articles 22 are placed on the proper shelf. Taking inventory of the library's entire collection is an extremely labor intensive and error-prone activity. By using the system 120, the inventory process can be greatly simplified and performed by lower skilled employees. Accordingly, inventory checks can be performed more frequently than is the current practice.

The system 120 is implemented using a portable RFID scanner 42 connected at its output to a portable computer 122. The portable computer 122 stores the data collected by the RFID scanner 42 in a memory 130 and downloads the data to the computer 48 for updating of the database 66. In one embodiment of the invention, the portable computer 122 and computer 48 each include a wireless communication device 132 for allowing the portable computer 122 to continuously send the scanner data to the computer 48. In another embodiment of the invention, the portable computer 122 is periodically hardwired or otherwise physically connected to the computer 48 for downloading the data from the memory 130.

Referring to FIG. 9, in operation, the RFID scanner 42 is brought into the proximity of a shelf 124, and a first portion $126_1$ of the shelf 124 is interrogated by the scanner 42. The scanner 42 reads the return signals (serial numbers) from the tagged articles 22. The serial numbers are processed and stored in the memory 130 of the portable computer 122, and communicated to the database of the computer 48. Next, the scanner 42 is moved to an adjacent shelf portion $126_2$, or to another shelf, and the process is repeated. To ensure that no shelf portions are missed, the scanner 42 may overlap a small region of an adjacent, previously scanned shelf portion 126. This process causes articles 22 in overlap region 128 to be scanned twice, However, if each article 22 has a unique serial number, double scanning has no effect on the accuracy of the inventory scan because the second reading can be ignored.

Figure 10:
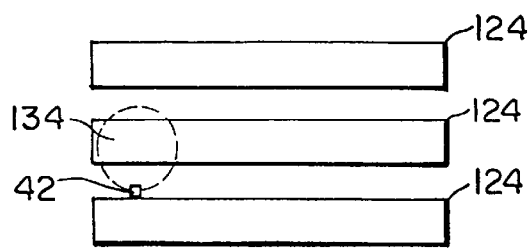
FIG. 10 is a top view of a row of shelves and shows an interrogation zone for conducting an inventory of articles using the system of FIG. 9.

Referring to FIGS. 9 and 10, the first portion $126_1$ is within a predefined zone 134 extending from the scanner 42. Preferably, the strength of the interrogation signal emanating from the scanner 42 is strong enough to effectively interrogate all articles 22 on first portion $126_1$ of the shelf 124, but not strong enough to reach articles 22 on adjacent rows of shelves. This feature is illustrated in FIG. 10 by the imaginary dashed line demarcating the predefined zone 134 which is parallel to the shelves.

After all article holding locations in the library 10 are scanned, the detected serial numbers are compared with the library inventory stored in the database 66 of articles that have not been checked out. A missing article report is generated of all articles 22 which were not located during the scanning process and which have not been checked out. Before an article 22 is presumed to be missing, the shelf should be physically inspected to determine whether the article 22 was merely missed by the scanning process or whether the tag 54 is missing or defective.

The system 120 may also be used to identify mislocated or misshelved articles 22. As each zone 134 is interrogated, the portable computer 122 and/or computer 48 checks to see if any of the read tags 54 are associated with articles 22 which do not belong in the scanned portion 126. For example, if the zone 134 covers books having call numbers from AD-140-xxxx to AD-190-xxxx, any articles 22 which have call numbers outside of this range are presumed to be misshelved. The portable computer 122 may signal the employee to locate and properly shelve the misshelved article 22. It should be recognized that many minor reshelving errors will not be detected by this method, such as when articles 22 with adjacent call numbers are transposed on the shelf (e.g., if AD-140-332D is on the right side of AD-140-332E, instead of the left side where it belongs).

The tag interrogators and scanners used in the present invention can detect a plurality of articles 22 which are simultaneously passed through an interrogator, or which are simultaneously scanned. In most instances, each of the articles 22 receive and respond to the interrogation signal at a different instance in time, even when the articles 22 are physically close together. The string of returned signals is processed to sort out the individual IDs. However, if two articles 22 return an ID signal at exactly the same instance, the interrogator or scanner can either sort out the returned signals to recover the two distinct IDs. Alternatively, the interrogator or scanner can ignore the simultaneously received signals and use subsequent return signals which are not simultaneously received to sort out the individual IDs.

Other variations of the present invention, without limitation, are listed below.

(1) Instead of storing and outputting a serial number, the tag 54 may store and output data about the article itself, such as its title or call number. Book publishers and the like may attach and program the tags 54 using an industry recognized coding scheme at the time books are printed.

(2) As discussed above, the tag 54 may have "write" capabilities, thereby allowing it to also store data about the circulation or checkout status of the article 22. The write capabilities may also be used to store data regarding the patron who checked out the article 22, as well as its due date.

Figure 11:
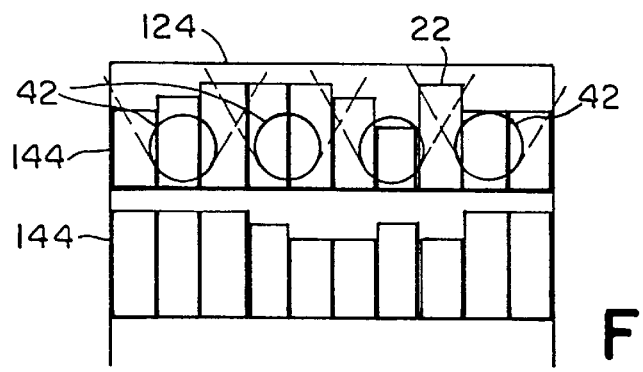
FIG. 11 is a front elevational view of a multi-row shelf and illustrates a method of conducting an inventory of articles using the system of FIG. 9.

(3) The focus of the scanned portion 126 in FIG. 9 can be made very small and narrow so that only one or a few articles 22 are scanned at one time. Thus, the zone 134 in FIG. 10 would encompass only one or a few articles 22. For example, FIG. 11 shows a scheme wherein the RFID scanner 42 is moved along a single row 144 of articles 22 within a shelf 124. Each row 144 is scanned separately. (For clarity, only the top portion of the scanner 42 is shown in FIG. 11.) Narrowing the zone 134 increases the time required to conduct inventory because the scanner 42 must be physically moved more often to cover each shelf. However, misshelved articles 22 are more easily located by scanning a narrower zone. For example, if articles 22 are scanned one by one, the system computers 66 and/or 122 can verify whether each article has a successively greater (or smaller) call number. In this manner, adjacent transposed articles 22 can be detected.

(4) The patron self-checkout system 50 of FIG. 5 may optionally include a debit card reader 142 connected to the computer terminal 52 for allowing a delinquent patron to pay fines. In this manner, the patron can quickly remedy the delinquency and become immediately authorized to check out subsequent articles 22.

(5) Research institutions often allow graduate students to keep articles at an assigned carol or kiosk somewhere in the building without checking them out of the building. Ideally, students are supposed to take the articles to the circulation desk to record that the articles are temporarily located at the assigned carol. However, students often neglect to do so. The shelf scanning inventory system 120 may be used to capture these stray articles. Periodically, library employees may walk from carol to carol and scan all of the articles at each carol. A location code identifying the carol may be appended to each article before or after they are scanned.

(6) It is often not feasible to tag certain articles, such as rare books or multi-media products (e.g., CD-ROMs). Accordingly, the patron's identification card may be used to track usage of the article and/or to control access into and out of a selected area of the library where the article is to be used. In this scheme, the patron ID card would preferably be an RFID tagged card. For example, if the patron borrows an item from a multi-media lab, the patron's RFID card and the article's jacket or holder (which is tagged) would be read and associated with each other. If the article is very expensive (e.g., the eight CD-ROM version of the Oxford English Dictionary costs libraries $895 per copy), the exit to the multi-media lab may be blocked if the patron attempts to exit the lab before returning the set of CD-ROMs, as well as the holder.

(7) The smart pedestals 36 may be designed to detect both conventional, (non-intelligent) deactivatable resonant tags and tags 54. In this manner, the same interrogation device may be used to detect the removal of conventionally tagged articles which have not been properly deactivated. Likewise, the dumb pedestals 40 may be designed to detect both tags 54 and conventional, (non-intelligent) deactivatable resonant tags. In this manner, an RFID tagged article which passes into or out of the periodical room 23 will be detected.

(8) The database records shown in FIG. 4 may include a security field for each tagged article 22. The security field may identify restrictions on the circulation of the article 22. For example, the security field may indicate that the article 22 must remain within the periodical room 23, or the multi-media lab described above. The security field may indicate that the article 22 can only be checked out by selected patrons, such as graduate students, or other predefined groups of patrons. These restrictions are checked by the computer 48 when the article 22 is detected at a check-out counter or at a pedestal 36.

(9) The term "checkout" is typically associated with borrowing books or the like from a library. However, "checkout" of an article is equivalent to "removal" of an article in contexts wherein checkout does not necessarily involve the borrowing of an article from a storage area.

(10) While the preferred embodiments of the invention use pairs of pedestals at exits, single pedestal interrogators may also be used where appropriate.

(11) The database records of selected articles may be changed by authorized library personnel without the presence of the article. For example, it may be desirable to set an alarm at a library entrance to trigger if an overdue article is detected. It may also be desirable to recall an article before its due date so that if the patron brings the properly checked out article to the library, the library employees are alerted to its presence.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An inventory control system for use in conjunction with articles which are maintained in a storage area, of the articles having a radio frequency tag attached thereto, each tag including an antenna for use in detecting the presence of the article by receiving an interrogation signal and returning a response signal and an integrated circuit connected to the antenna for storing article identification information and for outputting the article identification information with the response signal upon interrogation of the tag, the system comprising:

(a) at least one article return area for receiving articles which were removed from the storage area and which are to be returned to the storage area, the article return area including an interrogation zone and a collection bin for holding returned articles, the returned articles passing through the zone and into the collection bin as the articles are returned, wherein plural articles may be simultaneously placed in the zone;

(b) an interrogator for monitoring the zone for disturbances in the form of a response signal caused by the presence of one or more tags within the zone, the interrogator substantially simultaneously interrogating each article in the zone, the interrogator outputting an interrogator output signal for each tag detected in the zone, each interrogator output signal including the identification information stored in the integrated circuit of an interrogated tag; and (c) a database for receiving the interrogator output signals, the database including inventory data for articles monitored by the system including checkout status data, the received interrogator output signals being used to update the checkout status data of each returned article.

2. The system according to claim 1 wherein the system tracks articles associated with a library which are available for checkout by patrons, and the storage area comprises shelves of a library.

3. The system according to claim 2 wherein the article return area is a library book drop.

4. The system according to claim 1 wherein the system tracks articles associated with a library and the at least one article return area is within the library, the inventory data further including article usage data.

5. The system according to claim 1, wherein the database includes storage area location data for the articles monitored by the system.

6. The system according to claim 5 further comprising a computer in communication with the database, the computer including means for generating a report of the storage area locations for articles in the article return area, the report facilitating return of articles to their respective, appropriate locations in the storage area.

7. An inventory control method for use in conjunction with articles which are maintained in a storage area, each of the articles having a radio frequency tag attached thereto, each tag including an antenna for use in detecting the presence of the article by receiving an interrogation signal and returning a response signal and an integrated circuit connected to the antenna for storing article identification information and for outputting the article identification information with the response signal upon interrogation of the tag, the method comprising the steps of:

(a) scanning a portion of the storage area with a mobile interrogator, the mobile interrogator detecting disturbances in the form of response signals caused by the presence of tags on the articles within a predefined zone extending from the interrogator and outputting an interrogator output signal when a tag is detected in the zone, each interrogator output signal including the identification information stored in the integrated circuit of an interrogated tag, wherein plural articles located in the portion of the storage area may be simultaneously scanned;

(b) repeating step (a) for an adjacent portion of the storage area and for all remaining portions of the storage area;

(c) receiving the interrogator output signals in a database, the database including inventory data for the articles maintained in the storage area, wherein the inventory data is updated using only the received interrogator output signals obtained from the tagged articles;

(d) using the received interrogator output signals and the inventory data to determine whether an article in a particular scanned portion is outside of a range of articles which belong in the scanned portion, and, if so;

(e) signaling that the article is mislocated.

8. A library inventory control system for use in conjunction with articles which are maintained in a storage area, each of the articles having a radio frequency tag attached thereto, each tag including an antenna for use in detecting the presence of the article by receiving an interrogation signal and returning a response signal and an integrated circuit connected to the antenna for storing article identification information and for outputting the article identification information with the response signal upon interrogation of the tag, the system comprising:

(a) an inventory database including a list of articles in the library and the circulation status of each of the articles; and (b) a mobile interrogator for scanning the storage area in discrete portions, detecting disturbances in the form of a response signal caused by the presence of tags within a predefined zone extending from the interrogator, and for outputting an interrogator output signal for each tag detected in the zone, wherein plural articles located in the discrete portions may be simultaneously scanned, each interrogator output signal including the identification information stored in the integrated circuit of an interrogated tag, the inventory database receiving the identification information and updating the circulation status of the articles stored therein using only the identification information obtained from the interrogated tagged articles.

9. The system according to claim 8 wherein the tags are physically non-deactivatable tags.

10. A self-service check-in system for a library having articles available for checkout by patrons, each of the articles having a radio frequency tag attached thereto, each tag including an antenna for use in detecting the presence of the article by receiving an interrogation signal and returning a response signal and an integrated circuit connected to the antenna for storing article identification information and for outputting the article identification information with the response signal upon interrogation of the tag by an interrogator, the system comprising:

a tray for holding a plurality of articles;

a collection bin for holding returned articles;

a gate for allowing articles held on the tray to pass into the collection bin upon release of the gate;

an interrogator for substantially simultaneously interrogating the plurality of articles placed on the tray which the patron wants to return, the interrogator receiving a response signal containing the stored article identification information for each of the plurality of articles being returned, wherein the interrogator receives the response signals regardless of the orientation of the articles, the interrogator releasing the gate upon receiving acceptable response signals from each of the articles;

an inventory database including the articles in the library and the circulation status of each of the articles, the database receiving the article identification information for each article being returned; and a processor in communication with the database for updating the circulation status of the articles being returned.

11. The system according to claim 10 further comprising a patron identification (ID) card comprising a radio frequency identification tag, the patron ID card including patron identification information electronically stored thereon, wherein the patron ID card is placed on the tray and interrogated substantially simultaneously with the articles being returned.

12. The system according to claim 11 wherein the database includes a field for storing the patron ID corresponding to any previously checked out articles.

13. A library inventory control system for use in conjunction with articles which are maintained in a storage area, each of the articles having a radio frequency tag attached thereto, each tag including an antenna for use in detecting the presence of the article by receiving an interrogation signal and returning a response signal and an integrated circuit connected to the antenna for storing article identification information and for outputting the article identification information with the response signal upon interrogation of the tag by an interrogator, the system comprising:

an inventory database including a list of the articles in the library and the circulation status of each such article;

a patron identification device for identifying a patron to the system;

an article checkout system located in an article checkout area, the checkout system including a first interrogator for interrogating an article that the patron wants to remove from the storage area, the first interrogator receiving a response signal containing the stored article identification information for the article to be removed;

a processor in communication with the first interrogator and the database, the processor receiving the patron identification information and the article identification information for the article to be removed from the first interrogator, and updating the inventory database with the circulation status of the article to be removed;

an article check-in system including at least one article return area for receiving articles which were removed from the storage area and which are to be returned to the storage area, the article return area including an interrogation check-in zone and a collection bin for holding returned articles, each returned article passing through the check-in zone and into the collection bin as the article is returned, wherein plural articles may be simultaneously placed in the zone; and a second interrogator in communication with the processor, the second interrogator monitoring the check-in zone for disturbances in the form of a response signal caused by the presence of a tag within the zone, the interrogator simultaneously interrogating each article in the zone and outputting an interrogator output signal for each tag which is detected in the zone, each interrogator output signal including the identification information stored in the integrated circuit of an interrogated tag for the article being returned, wherein the inventory database receives the interrogator output signals and updates the checkout status data of each article being returned therewith.

14. The system according to claim 13 further comprising:

a mobile interrogator for scanning the storage area in discrete portions, detecting disturbances in the form of response signals caused by the presence of tags within a predefined zone extending from the mobile interrogator, and for outputting an interrogator output signal when a tag is detected in the zone, each interrogator output signal including the identification information stored in the integrated circuit of an interrogated tag, wherein the database receives the identification information and updates the circulation status of the articles stored therein with the information.

15. The system according to claim 13 further comprising:

a video camera for capturing images of the checkout area and outputting video signals of the captured images; and a video recorder for storing the video signals on a video storage medium.

16. The system according to claim 13 further comprising:

an exit interrogator for monitoring an exit from the storage area, the exit interrogator for interrogating an article passing through the exit and thereby being removed from the storage area, the exit interrogator receiving a response signal from the tag associated with the article, the response signal containing the stored article identification information for the article passing through the exit.

17. The system according to claim 16 further comprising an exit processor coupled to the exit interrogator, the processor receiving an output signal from the exit interrogator including the identification information of the response signal, wherein the processor compares the received identification information with the information stored in the database to determine whether the article is recorded therein as checked out.

18. The system according to claim 17 wherein the exit interrogator activates an alarm if the article passing through the exit is not recorded in the database as checked out.

19. The system according to claim 13 wherein the tag is a physically non-deactivatable tag.

20. The system according to claim 13 wherein the library includes a periodical room, the system further comprising a zone interrogator located at an exit of the periodical room for detecting the removal of tagged articles therefrom.

21. The system according to claim 20 wherein the zone interrogator activates an alarm in response to the detection of the removal of an article from the periodical room.

22. A library inventory control system for use in conjunction with articles which are maintained in the library, each of the articles having a radio frequency tag attached thereto, each tag including an antenna for use in detecting the presence of the article by receiving an interrogation signal and returning a response signal and an integrated circuit connected to the antenna for storing article identification information and for outputting the article identification information with the response signal upon interrogation of the tag by an interrogator, the system comprising:

an inventory database including a list of the articles in the library and the circulation status of each such article;

a patron identification device for identifying a patron to the system;

an article checkout system located in an article checkout area of the library, the checkout system including a first interrogator for interrogating an article that the patron wants to remove from the library, the first interrogator receiving a response signal containing the stored article identification information for the article to be removed;

a processor in communication with the first interrogator and the database, the processor receiving the patron identification information and the article identification information for the article to be removed from the first interrogator, and updating the inventory database with the circulation status of the article to be removed;

a video camera for capturing images of the checkout area and outputting video signals of the captured images;

a video recorder for storing the video signals on a video storage medium;

an article check-in system including at least one article return area for receiving articles which were removed from the library, each returned article passing through a check-in zone as the article is returned;

a second interrogator in communication with the inventory database, the second interrogator monitoring the check-in zone for disturbances in the form of a response signal caused by the presence of a tag within the zone, and outputting an interrogator output signal when a tag is detected in the zone, each interrogator output signal including the identification information stored in the integrated circuit of an interrogated tag for the article being returned, wherein the inventory database receives the interrogator output signals and updates the checkout status of the article being returned using the interrogator output signals;

a mobile interrogator for scanning discrete portions of the library and detecting disturbances in the form of response signals caused by the presence of tags within a predefined zone extending from the mobile interrogator, and for outputting an interrogator output signal when a tag is detected in the zone, wherein plural articles located in the discrete portions may be simultaneously scanned, each interrogator output signal including the identification information stored in the integrated circuit of an interrogated tag, wherein the database receives the identification information and updates the circulation status of the articles stored therein using only the identification information obtained from the interrogated tagged articles;

an exit interrogator for monitoring an exit from the library, the exit interrogator for interrogating an article passing through the exit and thereby being removed from the library, the exit interrogator receiving a response signal from the tag associated with the article, the response signal containing the stored article identification information for the article passing through the exit;

an exit processor coupled to the exit interrogator, the exit processor receiving an output signal from the exit interrogator including the identification information of the response signal, wherein the exit processor compares the received identification information with the information stored in the database to determine whether the article is recorded therein as checked out, wherein the exit interrogator activates an alarm if the article passing through the exit is not recorded in the database as checked out; and a zone interrogator located at an exit of a predefined area of the library, the zone interrogator for detecting the removal of tagged articles from the predefined area, wherein the zone interrogator activates an alarm in response to the detection of the removal of an article from the predefined area.

* * * * *